US006255595B1

(12) United States Patent
Metra et al.

(10) Patent No.: US 6,255,595 B1
(45) Date of Patent: *Jul. 3, 2001

(54) SUPERCONDUCTING CABLE WITH THE PHASE CONDUCTORS CONNECTED AT THE ENDS

(75) Inventors: Piero Metra, Varese; Marco Nassi, Turin, both of (IT)

(73) Assignee: Pirelli Cavi S.p.A. (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/763,909

(22) Filed: Dec. 11, 1996

(30) Foreign Application Priority Data

Dec. 28, 1995 (IT) ............................. MI95A2776

(51) Int. Cl.[7] ...................................... H01B 12/00
(52) U.S. Cl. ................. 174/125.1; 505/232; 505/231; 505/886; 174/15.5
(58) Field of Search .................. 505/886, 231, 505/232, 237, 239, 813, 821, 704, 885; 174/125.1, 15.4, 15.5, 26 R

(56) References Cited

U.S. PATENT DOCUMENTS

| 3,292,016 | 12/1966 | Kafka | 307/90 |
| 3,643,002 | * 2/1972 | Minnich | 174/15.5 |
| 3,730,966 | * 5/1973 | Aupoix et al. | 174/15.5 |
| 3,749,811 | * 7/1973 | Bogner et al. | 174/15.5 |
| 4,176,238 | * 11/1979 | Vulis et al. | 174/15.5 |
| 4,639,544 | * 1/1987 | Dableh et al. | 174/32 |

FOREIGN PATENT DOCUMENTS

| 2803228 | 7/1979 | (DE) . | |
| 3811050 | 10/1989 | (DE) . | |
| 2133233 | 10/1972 | (FR) . | |
| 0109211 | * 4/1990 | (JP) | 174/125.1 |

* cited by examiner

Primary Examiner—Kristine Kincaid
Assistant Examiner—Kamand Cuneo
(74) Attorney, Agent, or Firm—Norris, McLaughlin & Marcus; L. P. Brooks

(57) ABSTRACT

A superconducting cable for high power with at least one phase includes a superconducting core wherein a plurality of elements are housed, which are structurally independent and magnetically uncoupled, each of which includes—for each phase—a couple of phase and neutral coaxial conductors, each formed by at least a layer of superconducting material, electrically insulated from one another by interposition of a dielectric material. As a result of the distribution of the superconducting material into several coaxial conductive elements, the cable allows to transmit high current amounts in conditions of superconductivity, while using a high-temperature superconducting material sensitive to the magnetic field. The conductive elements are connected at the ends to yield a mean exploitation efficiency of 100%.

13 Claims, 4 Drawing Sheets

SUPERCONDUCTING CABLE WITH THE PHASE CONDUCTORS CONNECTED AT THE ENDS

DESCRIPTION

In a general aspect, the present invention relates to a cable to be used to transmit current in condition of so-called superconductivity, i.e., in conditions of almost null electric resistance.

More particularly, the invention relates to a superconducting cable for high power having at least one phase, including a superconducting core comprising a phase conductor and a neutral conductor, external to the former and coaxial to the same, each including at least a layer of superconducting material, said coaxial conductors being electrically insulated from one another by interposition of a dielectric material, as well as means for cooling said core at a temperature not higher than the critical temperature of said superconducting material.

In the following description and the subsequent claims, the term: cable for high power, indicates a cable to be used for transmitting current quantities generally exceeding 5,000 A, such that the induced magnetic field starts to reduce the value of the maximum current density achievable in superconductivity conditions.

In the following description and the subsequent claims, the term: superconducting material, indicates a material, such as for instance special niobium-titanium alloys or ceramics based on mixed oxides of copper, barium and yttrium, or of bismuth, lead, strontium, calcium, copper, thallium and mercury, comprising a superconducting phase having a substantially null resistivity under a given temperature, defined as critical temperature or $T_c$.

The term: superconducting conductor, or, shortly, conductor, indicates in the following any element capable of transmitting electric current in superconductivity condition, such as for instance a layer of superconducting material supported by a tubular core, or tapes of superconducting material wound on a supporting core.

As is known, in the field of energy transmission, one of the problems more difficult to solve is that of increasing as much as possible both the current to be transmitted in superconductivity conditions and the temperature at which the transmission takes place.

Even though the so-called "high-temperature" superconducting materials are available today, which can transmit currents at temperatures of the order of 70–77° K (about −203/−196° C.), a reduction in the current transmission capacity by said material is noticed when the induced magnetic field increases.

See on the matter, for instance, T. Nakahara "Review of Japanese R&D on Superconductivity", Sumitomo Electric Technical Review, Nr. 35, January 1993.

In superconductivity conditions, the sensitivity of superconducting materials to the effects of the induced magnetic field is ever more marked the greater is the working temperature of the superconducting core of the cable (i.e., the superconducting materials with the highest critical temperature are more sensitive to the effects of the magnetic field), so that in practice high-temperature superconducting materials do not allow for transmission currents higher than some KA, without an unacceptable increase in the quantity of superconducting materials to be used, and, along therewith, of the associated costs.

In the case of the so-called coaxial cables, whose configuration is suitable for transmission of high loads, the induced magnetic field, the transmitted current and the diameter of the conductor are tied by the following relation:

$$B=(\mu_o \times I)/(\pi \times D)$$

wherein:
B=magnetic field on the surface of the conductor;
I=transmitted current;
$\mu_o$=magnetic permeability;
D=diameter of the conductor.

(As is known, the values of B and I are to be understood as direct current actual values, or as alternate current effective values).

On the basis of this relation, it ensues that each increase in the transmitted current brings about a proportional increase in the induced magnetic field, which in turn limits, to a greater or smaller extent, the maximum current density obtainable in superconductivity conditions or technical critical current density, "$J_e$", defined as the ratio between the critical current and the total cross section of the layer of superconducting material.

More particularly, it has been noticed that the critical current density drastically decreases—sometimes up to two orders of magnitude—starting from a threshold value of the magnetic field, lower than the critical field above which the superconductivity is substantially compromised; indicatively, such value varies from 0.1 to 20 mT according to the superconducting material used and to the working temperature. In this regard, reference is made to, for instance, IEEE TRANSACTIONS ON APPLIED SUPERCONDUCTIVITY, vol. 5, nr. 2, June 1995, pp. 949–952.

The attempts made to keep the critical current density at acceptable values based on an increase in the conductor diameter, have until now failed, due to both the practical difficulty of making, transporting and installing a large diameter cable, and the high costs necessary to cool the superconducting core, as the thermal dissipations are proportional to the diameter of the insulating layer that surrounds the core of the superconductor.

Therefore, in view of these difficulties of technological nature, in the field of coaxial cables the art has been substantially restricted to either transmitting the desired high current quantities by means of suitable metal or ceramic materials at the temperature of 4° K, at which the aforementioned phenomena are less marked, or accepting an other than optimum exploitation of the superconducting material at the maximum temperature (65°–90° K) compatible with current transmission in superconductivity conditions.

In the first case, one has to face the high costs associated with the need of cooling the superconducting core at a very low temperature, while in the second case it is necessary to use a very high quantity of superconducting material.

According to the invention, it has now been found that the problem of transmitting within a coaxial cable having at least one phase high current quantities at the maximum working temperature of the superconducting materials available today (65°–90°K, determined by the usable materials and cooling fluids) can be solved by splitting up for each phase the superconducting material within the cable into a plurality of "n" elements, structurally independent and magnetically uncoupled, each of which comprises a couple of phase and neutral coaxial conductors, insulated from one another, and transmits a fraction "I/n" of the total current.

According to the invention, in fact, it has been found that with such distribution of the superconducting material it is possible to:

a) reduce the size of the cable, with the same use conditions of the superconducting material, with the ensuing easiness of construction, transport and installation of the cable;

b) use, with the same quantity of superconducting material, the same quantity of electric insulating material of conventional cables;

c) limit, with the same quantity of superconducting material, the size of the thermal insulation layers (cryostat) which surround the superconducting core of the cable, with an advantageous reduction in thermal losses; and d) have superconducting elements which, in case of need, can independently supply different loads.

Preferably, the phase and neutral coaxial conductors of each of said elements comprise a plurality of superimposed tapes of superconducting material, wound on a tubular cylindrical support, for instance made of metal or insulating material.

In order to reduce as much as possible the possible mechanical stresses in their inside, the tapes of superconducting material are wound on said support according to windup angles—either constant or variable from tape to tape and within each individual tape—of 10° to 60°.

Alternatively, the phase and neutral coaxial conductors of each of said elements may comprise a plurality of layers of superconducting material, superimposed and laid on the tubular cylindrical support.

According to the invention, the maximum number of coaxial conductive elements is determined by the minimum diameter of such elements compatible with the winding deformations of the tapes made of superconducting material, or compatible with the critical tensile deformation of the superconducting material chosen.

Preferably, the diameter of the phase conductor of each of said elements varies from 25 to 40 mm.

According to the invention, the superconducting core of the cable is cooled at temperatures not higher than 65°–90° K, dvantageously using so-called high-temperature superconducting materials and liquid nitrogen as cooling fluid.

Among these high-temperature superconducting materials, use may advantageously be made of those known in the art by the initials BSCCO having the formula:

$$Bi_\alpha Pb_\beta Sr_\gamma Ca_\delta Cu_\epsilon O_x \qquad (I)$$

wherein:

α is a number from 1.4 to 2.0; β is a number from 0 to 0.6; γ is a number from 0 to 2.5; δ is a number from 0 to 2.5; ε is a number from 1.0 to 4.0; and x is the stoichiometric value corresponding to the different oxides present.

According to the invention, particularly preferred are mixed oxides of the following ideal general formula:

$$(BiPb)_2 Sr_2 Ca_{n-1} Cu_n O_x$$

wherein n is a whole number from 1 to 3 and x is the stoichiometric value corresponding to the different oxides present.

Among them, particularly advantageous results have been obtained with the mixed oxide known as BSCCO-2223 (i.e., in which n=3), or with suitable mixtures of mixed oxides of the aforementioned metals, in such ratios as to obtain a mean stoichiometry of the mixture corresponding to that of the BSCCO-2223 oxide.

In another aspect, the present invention relates to a method for transmitting a current quantity higher than a prefixed value within a superconducting cable having at least one phase, which method is characterized in that said current is split up, for each phase, among a plurality of magnetically uncoupled conductive elements of a coaxial type, the number of such conductive elements being such that the current fraction carried in each of them is lower than a value which determines a superficial current density in each of the conductive elements corresponding to a magnetic field capable of generating a conductivity reduction of a superconducting material used, where superficial current density is defined as I/(π×D) and has the units A/m, where I is the transmitted current and D is the diameter of the conductor.

In a particular embodiment, such current is a multiphase alternate current, and said conductive elements among which the current is split up, carry a single phase of said current.

In a preferred embodiment of the method, said predetermine quantity of current is at least equal to 5,000 A. In the method according to the invention, and if liquid nitrogen is used as cooling fluid, the magnetic field capable of generating a conductivity reduction of the superconducting material used is lower than 200 mT, preferably lower than 100 mT and more preferably lower than 20 mT.

Further characteristics and advantages will appear more clearly from the following description of some examples of superconducting cables according to the invention, made—by way of non-limitative illustration—with reference to the attached drawings.

Figure 1:
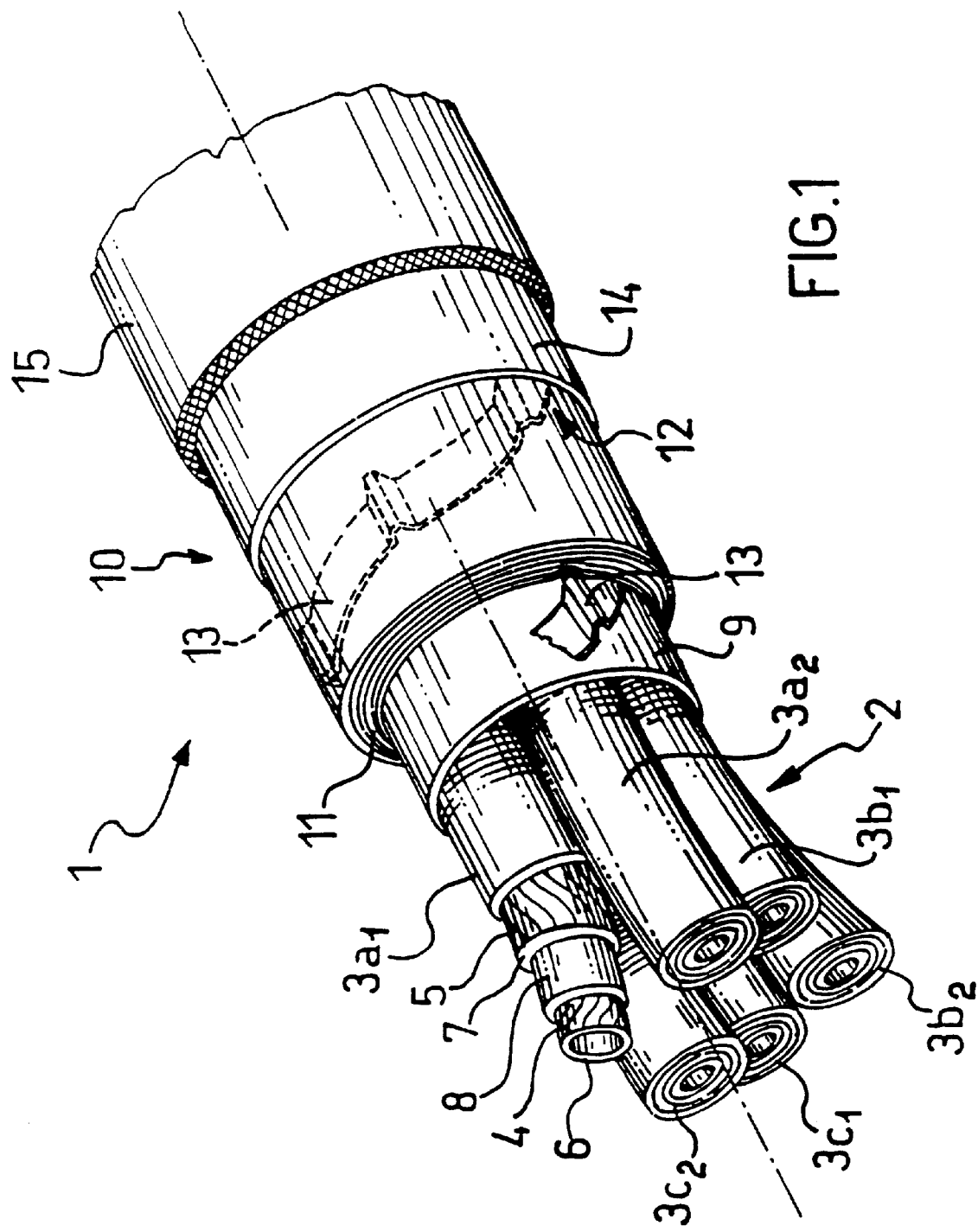
FIG. 1 shows a schematic view, in perspective and partial section, of a triphase superconducting cable, according to an embodiment of this invention.

With reference to FIG. 1, a triphase superconducting cable 1 according to this invention comprises a superconducting core globally indicated by 2, comprising a plurality of conductive elements 3, indicated by 3a, 3b, 3c for each phase, housed—preferably loosely—within a tubular containing shell 9, made e.g. of metal, such as steel, aluminium and the like.

Each of the conductive elements 3 comprises in turn a couple of coaxial conductors, respectively phase and neutral conductors 4, 5, each including at least one layer of superconducting material.

In the examples shown in the drawings, the superconducting material is incorporated in a plurality of superimposed tapes, wound on respective tubular supporting elements 6 and (possibly) 7, made of a suitable material, for instance formed with a spiral-wound metal tape, or with a tube made of plastics or the like.

The coaxial phase conductors 4 and neutral conductors 5 are electrically insulated from one another by interposing a layer 8 of dielectric material.

Cable 1 also comprises suitable means to cool the superconducting core 2 to a temperature adequately lower than the critical temperature of the chosen superconducting material, which in the cable of FIG. 1 is of the so called "high-temperature" type.

The aforementioned means comprises suitable pumping means, known per se and therefore not shown, supplying a suitable cooling fluid, for instance liquid nitrogen at a temperature typically of from 65° to 90° K, both in the inside of each of the conductive elements 3 and in the interstices between such elements and the tubular shell 9.

In order to reduce as much as possible the thermal dissipations towards the external environment, the superconducting core 2 is enclosed in a containing structure or cryostat 10, comprising a thermal insulation, formed for instance by a plurality of superimposed layers, and at least a protection sheath.

A cryostat known in the art is described, for instance, in an article of IEEE TRANSACTIONS ON POWER DELIVERY, Vol. 7, nr. 4, October 1992, pp. 1745–1753.

More particularly, in the example shown, the cryostat 10 comprises a layer 11 of insulating material, formed, for instance, by several surface-metallized tapes (some tens) made of plastics (for instance, a polyester resin), known in the art as "thermal superinsulator", loosely wound, with the possible help of interposed spacers 13. Such tapes are housed in an annular hollow space 12, delimited by a tubular element 14, in which a vacuum in the order of $10^{-2}$ N/m$^2$ is maintained by means of known apparatuses.

The tubular element 14 made of metal is capable of providing the annular hollow space 12 with the desired fluid-tight characteristics, and is covered by an external sheath 15, for instance made of polyethylene.

Preferably, the tubular metal element 14 is formed by a tape bent in tubular form and welded longitudinally, made of steel, copper, alumimium or the like, or by an extruded tube or the like.

If the flexibility requirements of the cable so suggest, element 14 may be corrugated.

In addition to the described elements, cable traction elements may also be present, axially or peripherally located according to the construction and use requirements of the same, to ensure the limitation of the mechanical stresses applied to the superconducting elements 3. Such traction elements, not shown, may be formed, according to techniques well known in the art, by peripherally arranged metal reinforcements, for instance by roped steel wires, or by one or more axial metal ropes, or by reinforcements made of dielectric material, for instance aramidic fibers.

According to the invention, several superconducting elements are present for each phase, in particular, as shown by way of example in FIG. 1, each phase (a, b, c) comprises two superconducting elements, respectively indicated by the subscripts 1, 2 for each of the three illustrated superconducting elements 3a, 3b, 3c, so that the current of each phase is split up among several conductors (two in the example shown) shown on FIG. 1 as superconducting elements $3a_1$ and $3a_2$, $3b_1$ and $3b_2$ or $3c_1$ and $3c_2$.

Figure 2:
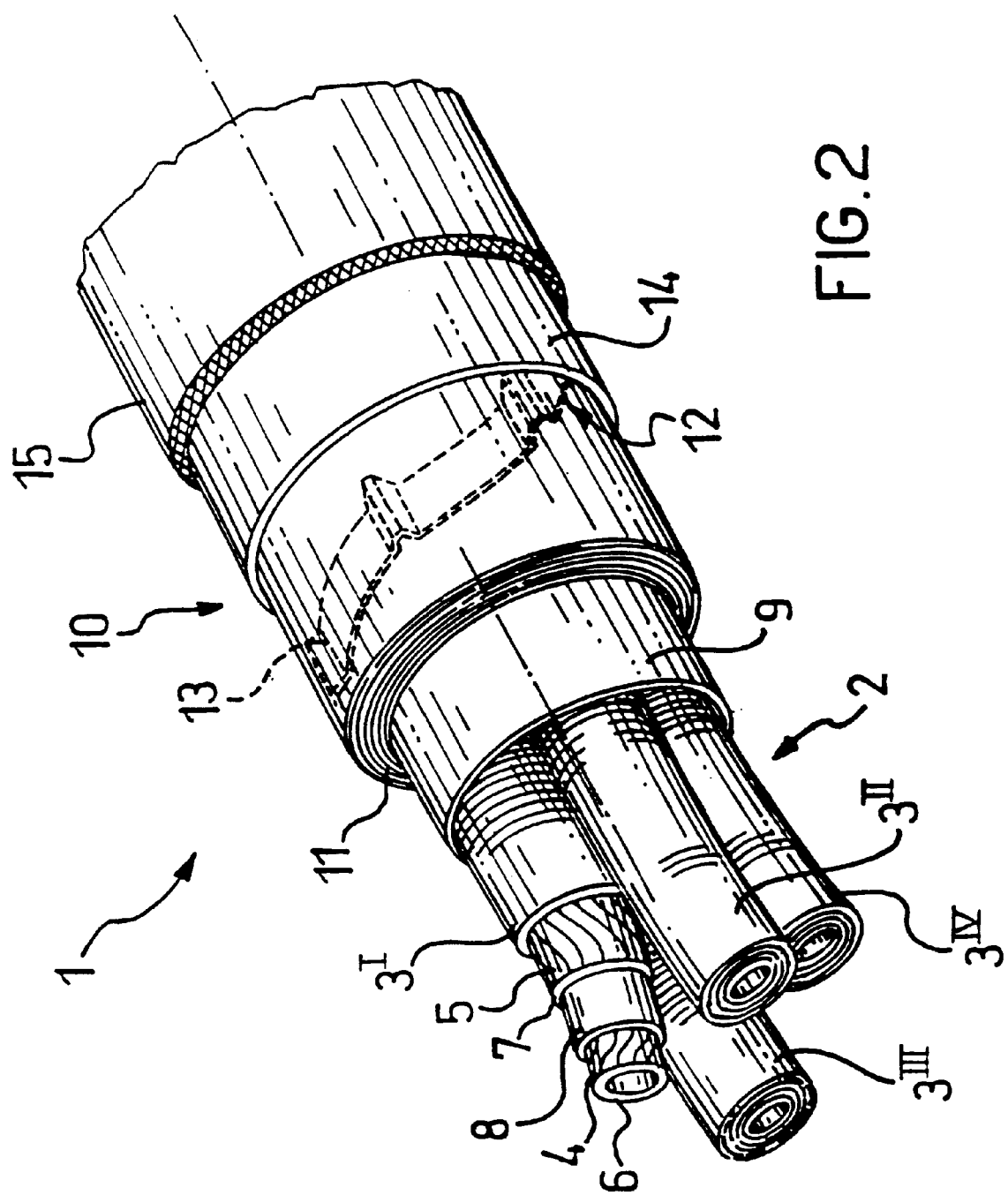
FIG. 2 shows a schematic view, in perspective and partial section, of a single phase superconducting cable, according to a further embodiment of this invention.
Figure 3:
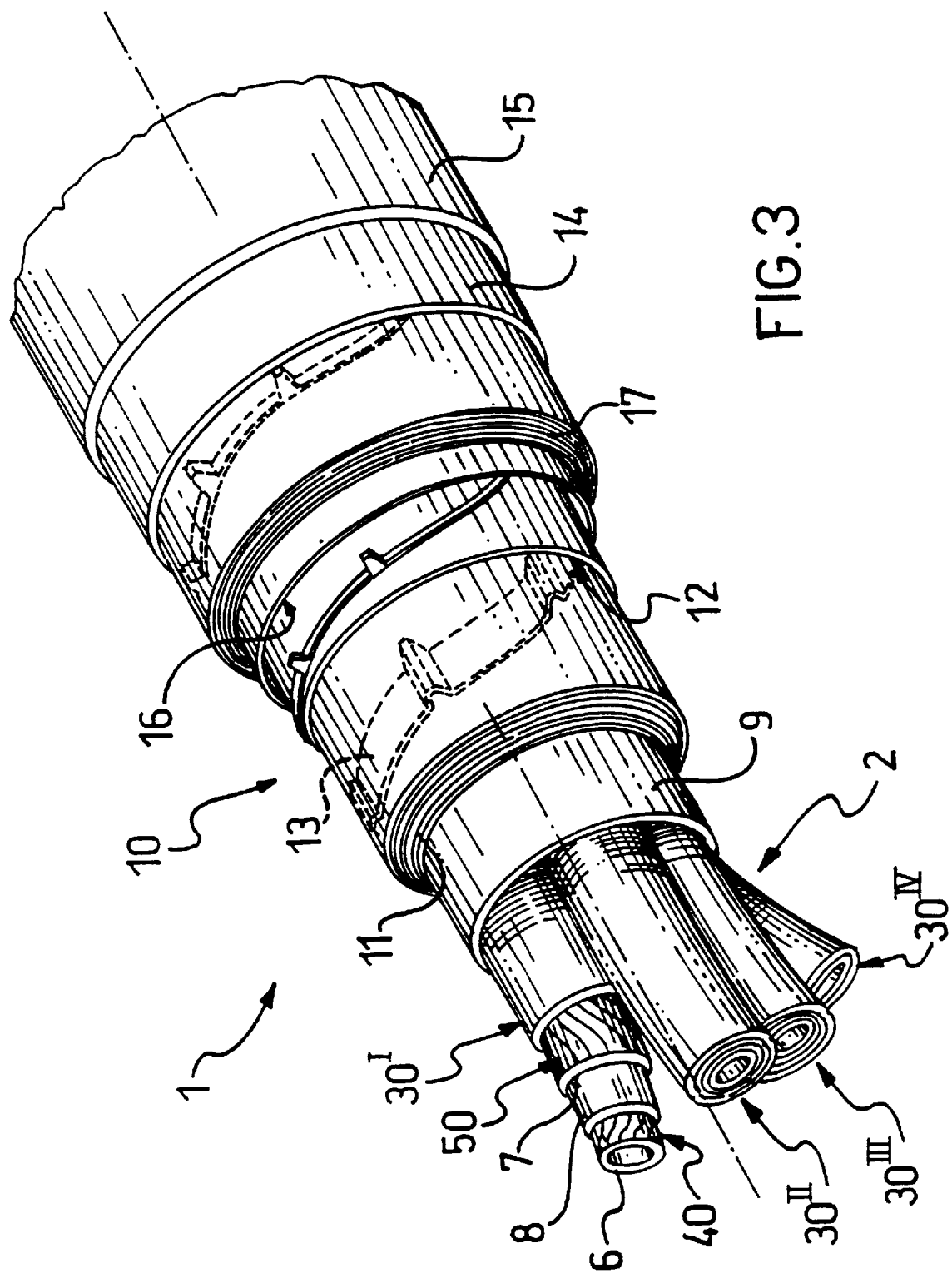
FIG. 3 shows a further embodiment of a cable according to this invention, using low-temperature superconductors.

FIGS. 2 and 3 schematically show two different embodiments of this invention, both of them relating to a monophase cable.

In the following description and in the figures, the components of the cable structurally or functionally equivalent to those previously described with reference to FIG. 1 will be indicated by the same reference numbers and will be no longer discussed.

In the embodiment of FIG. 2 four superconducting elements $3^I$, $3^{II}$, $3^{III}$, $3^{IV}$, structurally independent and magnetically uncoupled, are enclosed in the tubular containing shell 9.

In the cable of FIG. 3, phase and neutral coaxial conductors 40, 50 of four elements $30^I$, $3^{II}$, $30^{III}$, $30^{IV}$, comprise a superconducting material made of niobium-titanium alloy, for which the superconductivity conditions are reached by cooling the superconducting core 2 to about 4° K by means of liquid helium.

In this further embodiment, the cryostat comprises, besides a first layer of tapes 11, a hollow space 16 in which liquid nitrogen circulates at 65°–90° K, and a second layer of tapes 17, having a structure similar to the preceding ones.

Figure 4:
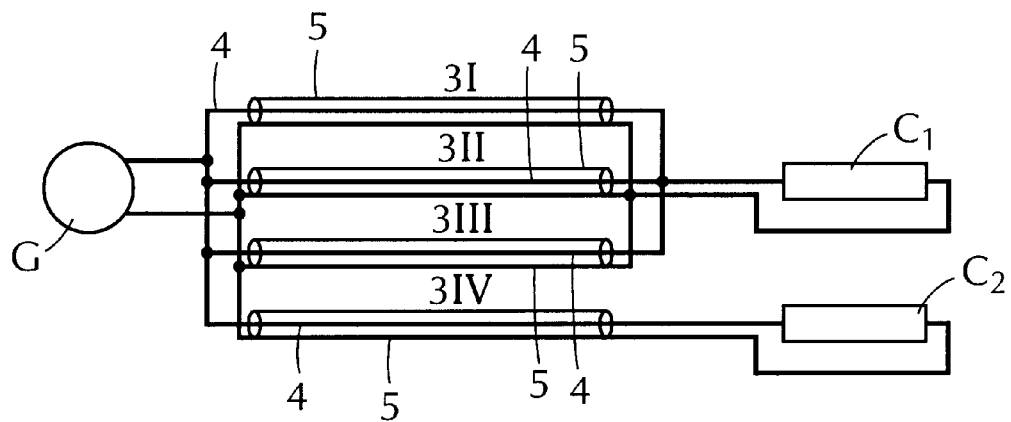
FIG. 4 shows an electric connection scheme of a single phase cable according to the invention with two independent loads.

FIG. 4 schematically shows an example of connection of the four elements, wherein a monophase generator G is connected to the respective phase and neutral superconductors 4 and 5 of elements $3^I$, $3^{II}$, $3^{III}$ and, $3^{IV}$. Each of the elements $3^I$, $3^{II}$ and $3^{III}$ is connected to a first load $C_1$ and element $3^{IV}$ is independently connected to a second load $C_2$.

With reference to what has been described hereinabove, some examples of superconducting cables according to the invention will be described hereunder by way of non-limitative illustration.

EXAMPLES 1–3

(Invention)

According to the invention, three high power superconducting cables of the monophase type were designed, incorporating respectively 37, 19 and 7 conductive elements 3 within the superconducting core 2.

All the cables were designed to be used in d.c. at a voltage of 250 kV (high voltage), using a thickness of the dielectric layer equal to 10 mm.

In all the cables the superconducting material used was the mixed oxide known as BSCCO-2223.

As the cryogenic fluid used in this case is constituted by liquid nitrogen at a temperature of 65 to 90° K, the cables possess the structure schematically illustrated in FIG. 2, using a cryostat 10 having an overall thickness equal to about 10 mm.

The design current was equal to 50 kA.

The design characteristics in d.c. of the cables were:
working magnetic field at the decay threshold of the critical current density, at the temperature of the cryogenic fluid (about 77° K)=20 mT; and
working magnetic field to which corresponds a critical current density equal to 50% of that with a field $\leq 20$ mT, at the temperature of the cryogenic fluid (about 77° K)=100 mT.

As to d.c. losses, it has been assumed by way of approximation that:
the losses of the conductor were negligible compared with the other losses;
the losses in the dielectric were negligible compared with the other losses;
the thermal dissipation losses from the cryostat—proportional to the surface thereof—were expressed by a ratio between the entering thermal power and the cryostat surface, equal to 3.5 W/m$^2$; and
the efficiency of the cooling plant were expressed by a ratio between the installed power Wi and the extracted thermal power We equal to 10 W/W.

Figure 5:
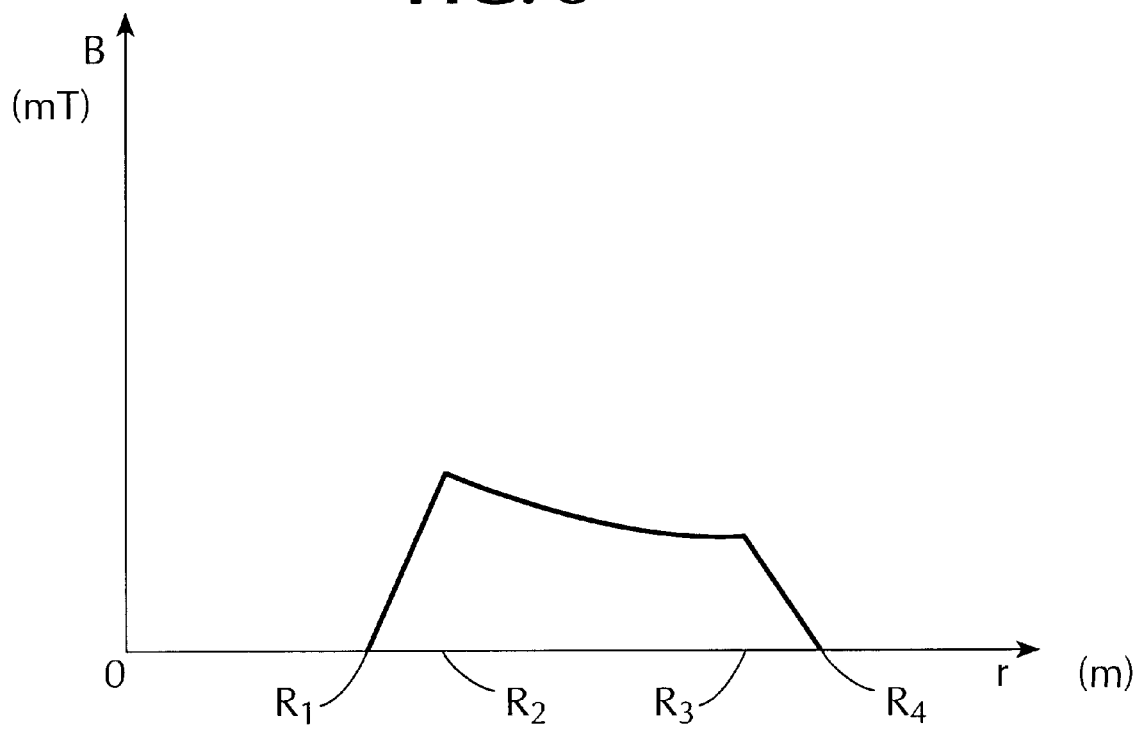
FIG. 5 shows a qualitative graph of magnetic field values within coaxial conductors including superconducting material and contained in a conductive element.

Therefore, as a first approximation, it is necessary to install for the cables considered a cooling plant having a power $W_i$ equal to 35 W/m$^2$. FIG. 5 shows the relationship between the magnetic field and radius of a conductive element of the superconducting cable according to the invention.

Then for all cables the mean exploitation efficiency of the superconductor was evaluated based on the following working hypotheses:

that the magnetic field generated within the superconducting material had to increase linearly from a 0 (zero) value on the internal surface of each of the phase coaxial conductors 4 (radius R1) and respectively on the external surface of the neutral ones 5 (radius R4), up to maximum values respectively on the external surface of the phase conductors 4 (radius R2) and on the internal surface of the neutral ones 5 (radius R3), as is schematically shown in FIG. 5, while in the hollow space between the phase and neutral conductors (between radiuses R2 and R3), the field changes according to the already mentioned law $$B = \frac{\mu_o I}{2\pi r} \cdot \frac{R_2}{r},$$

wherein r is the radius of the element and I is the current transmitted by conductors 4 and 5; and the exploitation efficiency of the superconducting material had a decreasing linear trend through the thickness, with threshold values equal to 100% on the surface having zero field and up to the threshold level of the field, and equal to the level corresponding to the decay produced by the maximum working field on the surface having maximum field, for each of the phase and neutral conductors (in particular 100% was assumed between 0 and 20 mT and 50% at 100 mT).

The structural and functional characteristics of the resulting cables are summarized in the following table I.

EXAMPLE 4

(Comparison)

In order to compare the cables of the invention with those of the prior art, a cable was designed comprising within the core 2 a single coaxial element incorporating superconducting material BSCCO-2223 cooled in liquid nitrogen.

The design conditions were the same of preceding examples 1–3, with the additional working limitation constituted by the fact of keeping a mean exploitation efficiency of the superconducting material equal to 100%.

The structural and functional characteristics of the resulting cables are summarized in the following table I.

EXAMPLE 5

(Comparison)

Again to compare the cables of the invention with those of the prior art, a cable was designed comprising within the core 2 a single coaxial element incorporating superconducting material BSCCO-2223 cooled in liquid nitrogen.

The design conditions were the same of the preceding example 4, with the additional working limitation constituted by the fact of fixing the working magnetic field to 100 mT.

As a consequence, the mean exploitation efficiency of the superconducting material was equal to about 70%.

The structural and functional characteristics of the resulting cable are summarized in the following table I.

EXAMPLE 5bis (Comparison)

Again to compare the cables of the invention with those of the prior art, a cable was designed comprising within the core 2 a single coaxial element incorporating superconducting material BSCCO-2223 cooled in liquid nitrogen.

The design conditions were the same of the preceding example 4, with additional working limitation constituted by the fact of fixing the diameter of the cryostat at a value equal to that of the preceding example 3 (0.195 m).

As a consequence, the mean exploitation efficiency of the superconducting material decreased to a value of about 60%. Therefore, compared with the cable of the invention, it is necessary to introduce—with the same diameter—a greater quantity of superconducting material with a remarkable increase both of the costs and of the technological manufacturing difficulties of the same cable.

The structural and functional characteristics of the resulting cable are summarized in the following table I.

EXAMPLES 6–8

(Comparison)

In order to compare the cables of the invention with those of the prior art, three cables were designed comprising within the core 2 a single coaxial element and incorporating respectively a superconducting material BSCCO-2223 (Example 6) and a niobium-titanium alloy (Examples 7 and 8).

Since the cryogenic fluid used was liquid helium at 4° K, the cables have the structure schematically shown in FIG. 3, using a cryostat 10 having an overall thickness equal to about 70 mm.

In these cases, it has been assumed as design data a minimum diameter of the single conductive element equal to 0.025 m, to respect the construction sizes that maintain the mechanical stresses within acceptable values.

The d.c. design characteristics were, consequently, a working magnetic field at the temperature of the cryogenic fluid (4° K) of 800 mT, to which corresponds a current density equal to 100% and 25% of the critical one, for the Examples 6 and 8 respectively, and a working magnetic field of 260 mT at the temperature of the cryogenic fluid (4° K) in Example 7.

As to d.c. losses, it has been assumed, by way of approximation, that:

the losses of the conductor are negligible compared with the other losses;

the losses in the dielectric are negligible compared with the other losses;

the thermal dissipation losses from the cryostat—proportional to the surface thereof—are expressed by a ratio between the entering thermal power and the cryostat surface, equal to 0.5 W/m$^2$; and the efficiency of the cooling plant is expressed by a ratio between the installed power $W_i$ and the extracted thermal power $W_e$ equal to 300 W/w.

Therefore, as a first approximation, it is necessary to install for the cables considered a cooling plant having a power $W_i$ equal to 185 W.

Then for all cables the mean exploitation efficiency of the superconductor was evaluated based on the criteria illustrated in the preceding Examples 1–5.

The structural and functional characteristics of the resulting cables are summarized in the following table I.

EXAMPLES 9–11

(Invention)

According to the invention, three high power superconducting cables were designed, incorporating respectively 37, 19 and 7 conductive elements inside the superconducting core 2.

The design data were the same as for the preceding Examples 1–3, except for the d.c. use voltage, equal in this case to 1 kV (low voltage).

Therefore, a thickness of the dielectric material layer 8 equal to 1 mm was used.

In all cables, the superconducting material used was the mixed oxide known as BSCCO-2223.

Since the cryogenic fluid used in this case is liquid nitrogen at a temperature of 77° K, the cables possess the structure schematically illustrated in FIG. 1, using a cryostat 10 having an overall thickness equal to about 10 mm.

Also in this case, the design current was equal to 50 kA.

The structural and functional characteristics of the resulting cables are summarized in the following table II.

EXAMPLE 12

(Comparison)

In order to compare the cables of the invention with those of the prior art, a cable was designed comprising within the core 2 a single coaxial element incorporating the superconducting material BSCCO-2223 cooled in liquid nitrogen.

The design conditions were the same of preceding Examples 9–11, with the additional working limitation constituted by the fact of keeping a mean exploitation efficiency of the superconductor equal to 100%.

The structural and functional characteristics of the resulting cables are summarized in the following table II.

EXAMPLE 13

(Comparison)

Again in order to compare the cables of the invention with those of the prior art, a cable was designed comprising within the core 2 a single coaxial element incorporating the superconducting material BSCCO-2223 cooled in liquid nitrogen.

The design conditions were the same of preceding Examples 9–11, with the additional working limitation constituted by the fact of fixing the working magnetic field at 100 mT.

As a consequence, the mean exploitation efficiency of the superconducting material was equal to 70%.

The structural and functional characteristics of the resulting cables are summarized in the following table II.

EXAMPLE 13bis (Comparison)

Again in order to compare the cables of the invention with those of the prior art, a cable was designed comprising within the core 2 a single coaxial element incorporating the superconducting material BSCCO-2223 cooled in liquid nitrogen.

The design conditions were the same of preceding Examples 9–11, with the additional working limitation constituted by the fact of fixing the diameter of the cryostat at a value equal to the preceding Example 11 (0.142 m).

As a consequence, the mean exploitation efficiency of the superconducting material dropped to a value of about 50%.

Therefore, compared with the cable of the invention, it is necessary to introduce—with the same diameter—a greater quantity of superconducting material with a remarkable increase both of the costs and of the technological manufacturing difficulties of the same cable.

The structural and functional characteristics of the resulting cables are summarized in the following table II.

EXAMPLES 14–16

(Comparison)

In order to compare the cables of the invention with those of the prior art, three cables were designed comprising within the core 2 a single coaxial element and incorporating respectively a superconducting material BSCCO-2223 (Example 14) and a niobium-titanium alloy (Examples 15 and 16).

As the cryogenic fluid used was liquid helium at 4° K, the cables have the structure schematically shown in FIG. 3, using a cryostat 10 having an overall thickness equal to about 70 mm.

The design characteristics and the d.c. losses of the cables were determined in the same way as that illustrated in Examples 6–9.

The mean exploitation efficiency of the superconducting material was evaluated based on the criteria illustrated in preceding Examples 1–5.

The structural and functional characteristics of the resulting cables are summarized in the following table II.

In the following tables I and II, the cooling costs have been indicated with reference, respectively, to the cables of Examples 3 and 11, for which the size and the costs for cooling the superconducting core 2 resulted to have a minimum value, at the loss of a non optimum use of the superconducting material, with the ensuing need of using a greater quantity of the same and with a higher level of electric losses.

With regard to the data reported in tables I and II, it should also be noted that the material BSCCO-2223 works with a 100% efficiency with a magnetic field equal to 800 mT (Examples 6 and 14), and that the NbTi alloy has, on the contrary, a 100% efficiency up to a magnetic field of about 260 mT (Examples 7 and 15), and equal to 25% at 800 mT (Examples 8 and 16).

From what has been described and illustrated hereinabove, it is immediately evident that the invention allows to couple a transmission of high current quantities with an optimum exploitation of high-temperature superconducting materials.

All this is achieved by keeping the size of the cables and the cooling costs at values fully acceptable from a technological point of view.

If the problems and costs associated to a non optimum use of the high-temperature superconductor should not be determinant for the purposes of the specific application, the invention allows all the same to reduce to a minimum the size of the cable—as shown by Examples 3 and 11—facilitating the construction, transport and installation operations, up to values quite comparable with helium-cooled cables of the known art, which have much higher manufacturing and operational costs.

In particular, it has to be observed that, while a cable according to the invention—with the same transmitted current—has an overall diameter (cryostat included) lower than 0.3 m, such as to allow, for instance, its winding on a reel, a cable of the known art, using a single coaxial conductive element, would have a diameter greater than 1 meter, if the superconducting material were used at a 100% efficiency (magnetic field lower than 20 mT).

In the same way, if a 70% efficiency of the superconducting material is accepted (magnetic field up to 100 mT), a cable according to this invention may have a diameter of 0.14 m, while a cable according to the known art would have a diameter of no less than 0.23 m, with the associated drawbacks, such as for instance a 60% increase of the cooling costs.

It must be noted that the subdivision into several superconducting elements does not involve an increase in the overall surface of the same conductors, and therefore it does not cause any actual increase in the volume of the insulation used.

According to the invention, furthermore, it is advantageously possible to:

- reduce the size of the cable—with the same exploitation of superconducting material—with ensuing easiness of construction, transport and installation of the cable (compare Example 2 with Example 4, and Example 3 with Example 5);
- use—compared with the cables of the known art—the same quantity of electric insulation with the same quantity of supeconducting material;
- limit the size of the thermal insulation layers (cryostat) which surround the superconducting core of the cable, with an advantageous reduction in thermal losses (compare Examples 1 and 2 with Example 4, and Example 3 with Example 5);
- have magnetically uncoupled conductive elements capable of supplying different loads;
- make flexible, high-efficiency superconducting bus bars; and
- use in the best way and therefore reduce the quantity of superconducting material present in the various phase and neutral conductors, with the same cable diameter and therefore also with the same cooling costs.

It should be noted that, should one wish to make a high voltage cable (250 KV) with a diameter of 0.14 m according to the known art, i.e. with a single element of the coaxial type, a magnetic field of 175 mT would be reached to which corresponds an exploitation efficiency of the superconducting material equal to 50%, compared with the 70% obtainable according to the invention (see on the matter Examples 3 and 5bis).

In the same way, should one wish to make a low voltage cable (1 KV) with a diameter of 0.2 m according to the known art, i.e. with a single element of the coaxial type, a magnetic field of 130 mT would be reached to which corresponds an exploitation efficiency of the superconducting material equal to 60%, compared with the 70% obtainable according to the invention (see on the matter Examples 11 and 13bis).

What has been illustrated with reference to cables of the monophase type, applies also to cables of the triphase type or, more generally, multi-phase, of the type shown in FIG. 1, in which a remarkable advantage is reached by splitting up the conductive elements of each phase into several elements, each of which carries a fraction of the global current of the phase.

For instance, a triphase cable for supplying 1700 MVA at 20 KV, manufactured with a single conductive element for each phase would require a diameter on the cryostat of 0.52 m.

According to the present invention, by splitting up each phase into 7 phase conductors, the cable would have a diameter on the cryostat of 0.43 m, with the same use of the superconducting material.

In the same way, a triphase cable for supplying 35 MVA at 400 V, manufactured with a single conductive element for each phase, would require a diameter on the cryostat of 0.48 m. According to the present invention, by splitting up each phase into 7 phase conductors, the cable would have a diameter on the cryostat of 0.32 m, with the same use of the superconducting material.

With regard to the method of the invention, it has also been observed that current quantities higher than a predetermined value, generally equal to at least 5,000 A, may be carried—with the aforementioned advantages—by splitting up the total current into a number of magnetically independent conductors such that the current fraction carried within each of them is smaller than a threshold value inducing a magnetic field capable of limiting the conductivity of the superconductive material used.

Obviously, those skilled in the art may introduce variants and modifications to the above described invention, in order to satisfy specific and contingent requirements, variants and modifications which fall within the scope of protection as is defined in the following claims.

TABLE I

| Example | 1 | 2 | 3 | 4 | 5 | 5bis | 6 | 7 | 8 |
|---|---|---|---|---|---|---|---|---|---|
| Material | | | | BSCCO | | | | NbTi | |
| Nr. of elements per phase | 37 | 19 | 7 | 1 | 1 | 1 | 1 | 1 | 1 |
| Critical current for cond. [A] | 1350 | 2630 | 7140 | 50000 | 50000 | 50000 | 50000 | 50000 | 50000 |
| Working temp. [° K.] | 77 | 77 | 77 | 77 | 77 | 77 | 4 | 4 | 4 |
| Working magnetic field [mT] | 20 | 20 | 100 | 20 | 100 | 130 | 800 | 260 | 800 |
| Mean exploitation efficiency of the SC material [%] (Approx.) | 100 | 100 | 70 | 100 | 70 | 60 | 100 | 100 | 90 |
| $\phi$ single phase conductor [m] | 0.027 | 0.053 | 0.0285 | 1 | 0.2 | 0.15 | 0.025 | 0.077 | 0.025 |
| $\phi$ single element [m] | 0.057 | 0.083 | 0.0585 | 1.03 | 0.23 | 0.18 | 0.055 | 0.107 | 0.055 |

TABLE I-continued

| Example | 1 | 2 | 3 | 4 | 5 | 5bis | 6 | 7 | 8 |
|---|---|---|---|---|---|---|---|---|---|
| φ cryostat [m] | 0.419 | 0.435 | 0.195 | 1.05 | 0.25 | 0.195 | 0.195 | 0.247 | 0.195 |
| Cooling costs | 2.1 | 2.2 | 1 | 5.4 | 1.3 | 1 | 5.3 | 6.7 | 5.3 |

TABLE II

| Example | 9 | 10 | 11 | 12 | 13 | 13bis | 14 | 15 | 16 |
|---|---|---|---|---|---|---|---|---|---|
| Material | | | BSCCO | | | | | NbTi | |
| Nr. of elements per phase | 37 | 19 | 7 | 1 | 1 | 1 | 1 | 1 | 1 |
| Critical current for cond. [A] | 1350 | 2630 | 7140 | 50000 | 50000 | 50000 | 50000 | 50000 | 50000 |
| Working temp. [° K.] | 77 | 77 | 77 | 77 | 77 | 77 | 4 | 4 | 4 |
| Working magnetic field [mT] | 20 | 20 | 100 | 20 | 100 | 175 | 800 | 260 | 800 |
| Mean exploitation efficiency of the SC material [%] (Approx.) | 100 | 100 | 70 | 100 | 70 | 50 | 100 | 100 | 90 |
| φ single phase conductor [m] | 0.027 | 0.053 | 0.0285 | 1 | 0.2 | 0.11 | 0.025 | 0.077 | 0.025 |
| φ single element [m] | 0.039 | 0.065 | 0.0405 | 1.012 | 0.212 | 0.122 | 0.037 | 0.089 | 0.037 |
| φ cryostat [m] | 0.293 | 0.343 | 0.142 | 1.032 | 0.232 | 0.142 | 0.177 | 0.229 | 0.177 |
| Cooling costs | 2.1 | 2.4 | 1 | 7.3 | 1.6 | 1 | 6.6 | 8.6 | 6.6 |

We claim:

1. A high power superconducting cable comprising:

a superconducting core comprising a plurality of magnetically uncoupled conductive elements having opposing ends for connection, respectively, to a source for providing a predetermined current having at least one phase and to at least one load, wherein each of said conductive elements comprises a couple of phase and neutral conductors, wherein each of the neutral conductors is external and coaxial to a respective one of the phase conductors, wherein each of the phase and neutral conductors includes at least a layer of a superconducting material, each of said phase and neutral conductors being electrically insulated from one another by interposition of a dielectric material and each of said conductive elements being electrically insulated from one another;

means for cooling said core at a temperature not higher than the critical temperature of said superconducting material; and means for electrically connecting, at one of the opposing ends, a predetermined number of the conductive elements to each other such that each of the predetermined number of the conductive elements carries a fraction of the predetermined current provided by the source, wherein said predetermined number is of a value such that the fraction of the predetermined current is lower than a value which determines a superficial current density in each of the predetermined number of the conductive elements corresponding to a magnetic field capable of generating a conductivity reduction in the superconducting material and wherein the superconducting material is distributed among the predetermined number of conductive elements to provide that the mean exploitation efficiency of the superconducting material is about 100%.

2. Superconducting cable according to claim 1, characterized in that each of said phase and neutral conductors comprises a plurality of tapes of said superconducting material wound on tubular cylindrical supports.

3. Superconducting cable according to claim 2, characterized in that each of said phase and neutral conductors comprises a plurality of layers of said superconducting material placed on said tubular cylindrical supports.

4. Superconducting cable according to claim 2, characterized in that said tapes of superconducting material are wound on said supports with windup angles of 10° to 60°.

5. Superconducting cable according to claim 1, characterized in that the diameter of the phase conductor of each of said conductive elements is between 25 and 40 mm.

6. Superconducting cable according to claim 1, characterized in that said core is cooled at a temperature from 65° to 90° K.

7. Superconducting cable according to claim 1, characterized in that said core is cooled by means of liquid helium at a temperature of about 4° K.

8. Superconducting cable according to claim 1, characterized in that said superconducting material has the following formula:

$$Bi_\alpha PB_\beta Sr_\gamma Ca_\delta Cu_\epsilon O_x \qquad (I)$$

wherein

α is a number from 1.4 to 2.0; β is a number from 0 to 0.6; γ is a number from 0 to 2.5; δ is a number from 0 to 2.5; ε is a number from 1.0 to 4.0; and x is the stoichiometric value corresponding to the different oxides present.

9. The superconducting cable of claim 1, wherein said phase conductors of said predetermined number of the conductive elements are electrically connected in parallel.

10. A system for transmitting a current quantity greater than a predetermined value within a superconducting cable comprising:

a generator having at least one phase;

a superconducting core comprising, for the at least one phase, a plurality of coaxial superconductors, wherein each of the superconductors is connected to said one phase and includes at least a layer of a superconducting material and wherein each of the superconductors is electrically insulated from one another and carries a fraction of the current being transmitted;

at least one load; and means for electrically connecting a predetermined number of said plurality of the coaxial superconductors to each other and to said at least one load, wherein said predetermined number is of a value such that the fraction of the current is lower than a value which determines a superficial current density in each of the predetermined number of the superconductors corresponding to a magnetic field capable of generating a conductivity reduction in the superconducting material and wherein the superconducting material is distributed among the respective predetermined number of superconductors to provide that the mean exploitation efficiency of the superconducting material is about 100%.

11. A high power superconducting cable for carrying a predetermined high current and comprising:

a plurality of superconducting conductors within a sheath and having opposing ends for connection, respectively, to a source for providing a predetermined current having at least one phase and to at least one load, each of said superconducting conductors comprising a phase conductor of superconducting material and a neutral conductor which is a layer of a superconducting material coaxial with said phase conductor and each of said superconducting conductors being electrically insulated and magnetically uncoupled from one another;

means for cooling said superconducting conductors to a temperature not higher than the critical temperature of said superconducting material; and means for electrically connecting, at one of the opposing ends, a predetermined number of the conductors to each other such that each of the predetermined number of said conductors carries a fraction of the current provided by the source, wherein said predetermined number is of a value such that the fraction of the current is lower than a value which determines a superficial current density in each of the predetermined number of the conductors corresponding to a magnetic field capable of generating a conductivity reduction in the superconducting material and wherein the superconducting material is distributed among the respective predetermined number of conductive elements to provide that the mean exploitation efficiency of the superconducting material is about 100%.

12. A system for transmitting a current quantity greater than a predetermined value within a superconducting cable comprising:

a generator having at least one phase;

a high power superconducting cable comprising:

a superconducting core comprising, for the at least one phase, a plurality of magnetically uncoupled conductive elements, wherein each of said conductive elements is connected to said at least one phase to carry a fraction of the current being transmitted and comprises a couple of phase and neutral conductors, wherein each of the neutral conductors is external and coaxial to a respective one of the phase conductors, wherein each of the phase and neutral conductors includes at least a layer of a superconducting material, wherein said phase and neutral conductors are electrically insulated from one another by interposition of a dielectric material and wherein each of said conductive elements is electrically insulated from one another; and means for cooling said core at a temperature not higher than the critical temperature of said superconducting material;

at least one load; and means for electrically connecting a predetermined number of said plurality of conductive elements to each other and to said at least one load, wherein said predetermined number is of a value such that the fraction of the current is lower than a value which determines a superficial current density in each of the predetermined number of the superconductors corresponding to a magnetic field capable of generating a conductivity reduction in the superconducting material and wherein the superconducting material is distributed among said predetermined number of superconductors to provide that the mean exploitation efficiency of the superconducting material is about 100%.

13. A system for transmitting a current quantity greater than a predetermined value comprising:

a generator having at least one phase;

a high power superconducting cable comprising:

a plurality of superconducting conductors within a sheath, wherein each of said superconducting conductors comprises a phase conductor of superconducting material and a neutral conductor which is a layer of a superconducting material coaxial with said phase conductor, wherein said superconducting conductors are electrically insulated and magnetically uncoupled from one another and wherein each of said superconducting conductors is connected to said at least one phase to carry a fraction of the current being transmitted, and means for cooling said core at a temperature not higher than the critical temperature of said superconducting material;

at least one load; and means for electrically connecting a predetermined number of said plurality of superconducting conductors to each other and to said at least one load, wherein said predetermined number is of a value such that the fraction of the current is lower than a value which determines a superficial current density in each of the predetermined number of the superconductors corresponding to a magnetic field capable of generating a conductivity reduction in the superconducting material wherein a superconducting material is distributed in the layers of the superconducting material in the respective predetermined number of superconductors to provide that the mean exploitation efficiency of the superconducting material is about 100%.

* * * * *